May 26, 1931.  H. A. CLARK  1,807,567

OIL SEAL

Filed June 25, 1928   3 Sheets-Sheet 1

Inventor:
Harold A. Clark,
By Cromwell, Greist + Warden
Attys.

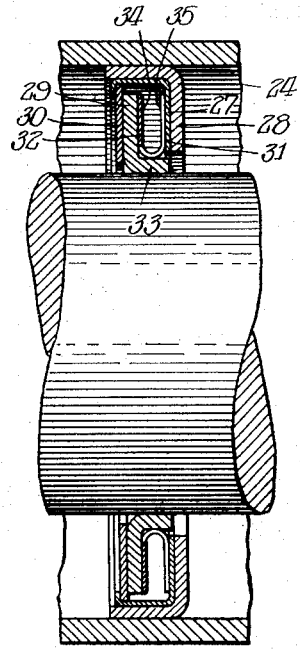
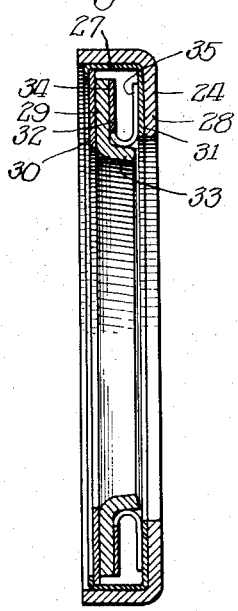
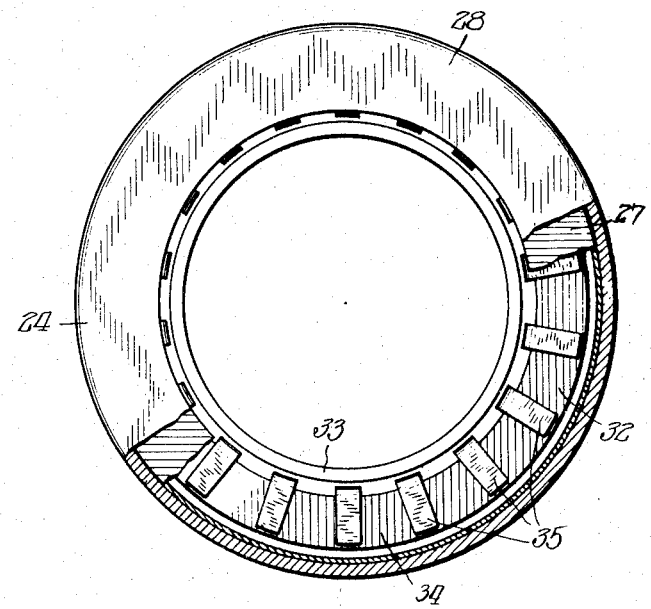

May 26, 1931. H. A. CLARK 1,807,567
OIL SEAL
Filed June 25, 1928 3 Sheets-Sheet 3
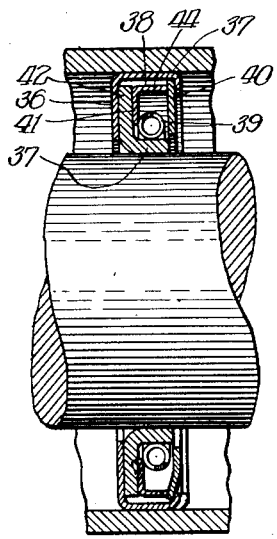
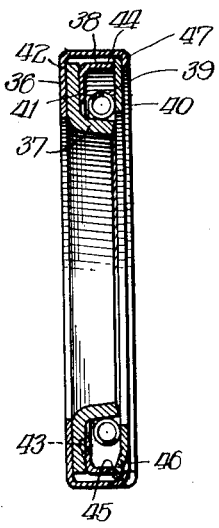
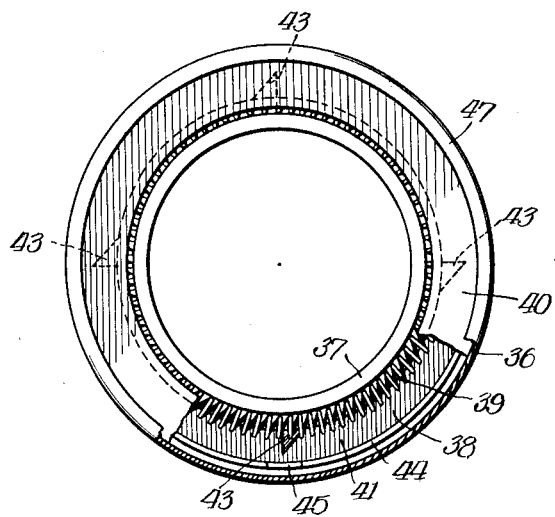
Inventor:
Harold A. Clark,
By Cromwell, Greist & Warden
attys.

Patented May 26, 1931

1,807,567

UNITED STATES PATENT OFFICE

HAROLD A. CLARK, OF NORTHBROOK, ILLINOIS, ASSIGNOR TO CHICAGO RAWHIDE MANUFACTURING COMPANY, OF CHICAGO, ILLINOIS, A CORPORATION OF ILLINOIS

OIL SEAL

Application filed June 25, 1928. Serial No. 288,093.

The present invention pertains to oil seals of the type disclosed in my copending application Serial No. 187,723, filed April 30, 1927.

The principal object of the invention is to provide a seal of novel construction which will function efficiently for the purpose intended.

Three different forms of the invention are presented herein for the purpose of exemplification, but it will of course be understood that the invention is susceptible of embodiment in other structurally modified forms coming equally within the scope of the claims.

Figure 1:
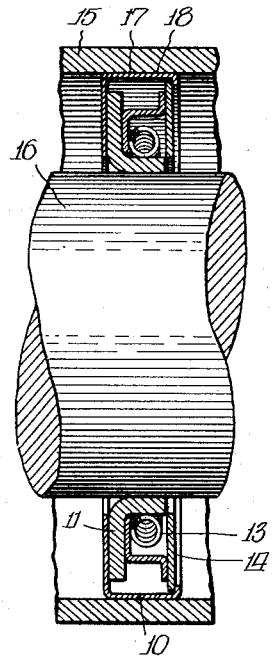
Fig. 1 is a diametric section through the seal, showing the same positioned within a housing about a rotating shaft.
Figure 2:
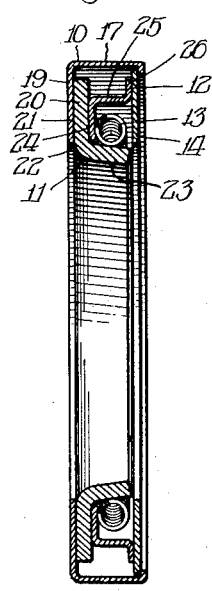
Fig. 2 is another diametric section, showing the same before application.
Figure 3:
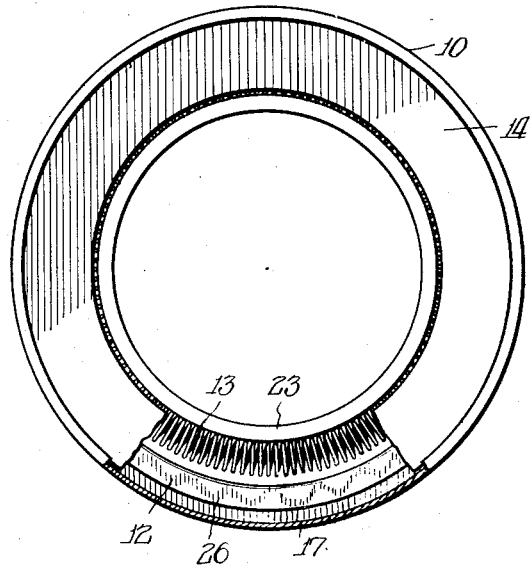
Fig. 3 is an end view, with portions broken away to show the interior construction.

Figs. 4, 5 and 6 are views corresponding to Figs. 1, 2 and 3, showing another form of the seal; and Figs. 7, 8 and 9 are views corresponding to Figs. 1, 2 and 3, showing still another form of the seal.

The seal shown in Figs. 1, 2 and 3 includes a cage 10, a packing 11, a spacer 12, a spring 13 and a washer 14. The seal is adapted to fit within a housing 15 about a shaft 16, which shaft is substantially concentric with the housing.

The cage 10 of the seal is a cup-shaped sheet metal stamping in which the other parts of the seal are enclosed. The cage has a cylindrical portion 17 which is in fixed fluid-tight association with the inner wall of the housing at 18, and a flat portion 19 which is in shiftable fluid-tight association with a flat portion 19 which is in shiftable fluid-tight association with a flat portion 20 of the packing 11 at 21. The flat portion 19 of the cage is provided with an aperture 22 of larger diameter than the shaft 16, through which aperture such shaft extends.

The packing 11 is preferably made of leather and has, in addition to the flat portion 20, a slightly converging portion 23 which is in rotatable fluid-tight association with the shaft 16 and is distended to a more nearly cylindrical form when in such association. The flat portion 20 of the packing is of smaller outside diameter than the flat portion 19 of the cage, whereby to permit the packing to float radially with respect to the cage while continuing in fluid-tight association with the same.

The spacer 12 is a cup-shaped sheet metal stamping which serves to hold the flat portion 20 of the packing snugly up against the flat portion 19 of the cage. The spacer has a flat portion 24 which engages with the packing, a cylindrical portion 25, and another flat portion 26 which engages with the washer 14.

The spring 13 extends in an endless tensioned coil about the distended portion 23 of the packing, and serves to press resiliently against the shaft 16. The spring is of such size as to clear both the spacer 12 and the washer 14.

The washer 14—which completes the assembly—is clamped under pressure against the spacer 12 and closes off the otherwise open face of the cage 10. The edge of the cylindrical portion 17 of the cage is swung over the edge of the washer to hold the latter in position.

From the foregoing, it will be understood that the spacer holds the flat portion of the washer snugly against the flat portion of the cage while permitting the former to float with respect to the latter, and that the spring hugs the barrel of the packing free from both the spacer and the washer and is not in any way affected by such floating action.

The seal shown in Figs. 4, 5 and 6 differs from the seal shown in Figs. 1, 2 and 3 in that the cage 27 is nested within a heavy reinforcing shell 28, the flat portion 29 of the packing is in shiftable fluid-tight association with the washer 30 rather than with the flat portion 31 of the cage, and the spacer and coil spring are replaced by a single spring member 32 which is compressed resiliently between the flat portion 29 of the packing and the flat portion 31 of the cage and presses resiliently against the distended portion 33 of the packing.

The spring member 32 is a sheet metal stamping which is characterized by a flat annular portion 34 and a number of circumferentially spaced spring tongues 35 which extend inwardly from the flat portion and curve outwardly again in spaced relation to such portion. The curved portions of the tongues press resiliently against the distended portion of the packing and serve to constrict such portion, while the ends of the tongues press resiliently against the flat portion of the cage and serve to hold the flat portion of the packing in shiftable but fluid-tight engagement with the washer.

The seal shown in Figs. 7, 8 and 9 is quite similar to the seal shown in Figs. 1, 2 and 3. It includes a cage 36, a packing 37, a spacer 38, a spring 39 and a washer 40, which parts are in the same relation to each other as the parts in the seal shown in Figs. 1, 2 and 3. In this form of the invention, however, means are provided for preventing any circumferential movement at all of the packing 37 with respect to the other parts. The flat portion 41 of the spacer which bears against the radially flanged portion 42 of the packing is provided with a number of circumferentially spaced spur-like projections 43 which imbed within the packing, and the cylindrical portion 44 of the spacer is provided with a notch 45 into which a tongue 46 on the washer 40 is deflected, thereby locking the packing against circumferential movement with respect to the spacer and the spacer against circumferential movement with respect to the washer, without interfering with radial floating movement of the packing and spacer with respect to the washer. The washer 46 is in turn locked against circumferential movement with respect to the cage by indenting the spun-over edge 47 of the cage into the notch in the washer resulting from the deflection of the tongue 46.

I claim:

1. In a seal, two axially spaced centrally apertured cage members, one of which is attached to the other, a flexible sheet packing which is shiftable radially within the space enclosed by said cage members and has a radially flanged portion in shiftable fluid-tight association with the inner face of one of said cage members and an axially sleeved portion of smaller inside diameter than the apertures in said cage members for rotatable fluid-tight association with a shaft passing through the same, a spacer member which is positioned about the axially sleeved portion of said packing and is clamped under pressure against the radially flanged portion of said packing by the inner face of the other of said cage members, and a spring member which is positioned under tension within the spacer member about the axially sleeved portion of said packing for constricting the packing on the shaft.

2. In a seal, two axially spaced centrally apertured cage members, one of which is attached to the other, a leather packing which is shiftable radially within the space enclosed by said cage members and has a radially flanged portion of substantially uniform thickness in radially shiftable fluid-tight association with the inner face of one of said cage members and an axially sleeved portion of smaller inside diameter than the apertures in said cage members for rotatable fluid-tight association with a shaft passing through the same, a spacer ring which is positioned about the axially sleeved portion of said packing in radially spaced relation to the same and is clamped under pressure against the radially flanged portion of said packing by the inner face of the other of said cage members, and an endless coil spring of less thickness than the spacer ring which is positioned under tension within the spacer ring about the axially sleeved portion of said packing for constricting the packing about the shaft.

3. As an article of manufacture, a self-contained seal for insertion as an assembled unit within a tubular housing in encompassing relation to a centrally located shaft, consisting of two axially spaced centrally apertured cage members, one of which is arranged within and peripherally secured to the other, a flexible sheet packing which is positioned within the space enclosed by said cage members and has a radially flanged portion in fluid-tight association with the inner face of one of said cage members and an axially sleeved portion of smaller inside diameter than the apertures in said cage members for fluid-tight association with a shaft passing through the same, a spacer member which is positioned about the axially sleeved portion of said packing and is clamped under pressure against the radially flanged portion of said packing by the inner face of the other of said cage members, and a spring member which is positioned about the axially sleeved portion of said packing for constricting the packing on the shaft.

4. In a seal, a cup-shaped cage, a cup-shaped ring nested within the cage, a radially flanged packing positioned in the cage with the radially extending portion of the packing between the bottom of the cage and the bottom of the ring, and an end-closure member for the cage by the latter and acting against the ring for clamping the radially extending portion of the packing between the bottom of the cage and the bottom of the ring.

5. In a seal, a cup-shaped cage, a cup-shaped ring nested within the cage, a radially flanged packing positioned in the cage with the radially extending portion of the packing clamped between the bottom of the cage and the bottom of the ring, and a washer secured to the cage and positioned between the rim of the cage and the rim of the ring for pressing the ring against the radially extending portion of the packing.

6. In a seal, a cup-shaped cage, a cup-shaped ring nested within the cage, a flanged packing having axially and radially extending portions, said packing being positioned in the cage with the radially extending portion of the packing clamped between the bottom of the cage and the bottom of the ring, a spring positioned about the axially extending portion of the packing, and a washer positioned in the cage against the ring and the spring.

7. In a seal, a cup-shaped cage, a cup-shaped ring nested within the cage, a flanged packing having axially and radially extending portions, said packing being positioned in the cage with the radially extending portion of the packing clamped between the bottom of the cage and the bottom of the ring, a coil spring positioned under tension within the ring about the axially extending portion of the packing, and a washer positioned under pressure within the cage against the rim of the ring in loose engagement with one side of the spring.

8. As an article of manufacture, a self-contained seal for insertion as an assembled unit within a tubular housing in encompassing relation to a centrally located shaft, consisting of a hollow inwardly opening annular cage which is closed at its ends and has a cylindrical peripheral portion for sealed engagement with the surrounding wall of the housing, a packing member housed within the cage with a radially extending portion of the member positioned against one end of the cage in spaced relation to the other end, a spacing ring positioned between the radially extending portion of the packing member and the opposite end of the cage, and a spring member enclosed within the spacing ring for constricting the packing member on the shaft.

9. As an article of manufacture, a self-contained seal for insertion as an assembled unit within a tubular housing in encompassing relation to a centrally located shaft, consisting of a hollow inwardly opening annular cage, a flanged packing member housed within the cage with the radially extending portion of the member positioned against one end of the cage in spaced relation to the other end, a spacing ring positioned between the radially extending portion of the packing member and the opposite end of the cage, a spring member enclosed within the spacing ring for constricting the packing member on the shaft, and circumferentially interlocking means between both the packing member and the ring and the cage and the ring.

10. As an article of manufacture, a self-contained seal for insertion as an assembled unit within a tubular housing in encompassing relation to a centrally located shaft, consisting of a hollow inwardly opening annular cage, a flanged packing member housed within the cage with the radially extending portion of the member positioned against one end of the cage in spaced relation to the other end, a spacing ring positioned between the radially extending portion of the packing member and the opposite end of the cage, a spring member enclosed within the spacing ring for constricting the packing member on the shaft, spurs on the spacing ring in embedded engagement with the packing member to prevent relative rotation therebetween, and a projection on the cage in interlocked engagement with the recess in the spacing ring to prevent relative rotation therebetween.

In testimony whereof I have hereunto subscribed my name.

HAROLD A. CLARK.

DISCLAIMER 1,807,567.—*Harold A. Clark*, Northbrook, Ill. OIL SEAL. Patent dated May 26, 1931. Disclaimer filed October 6, 1935, by the assignee, *Chicago Rawhide Manufacturing Company*.

Hereby enters this disclaimer to those claims of the specification of said Letters Patent which are as follows:

"1. In a seal, two axially spaced centrally apertured cage members, one of which is attached to the other, a flexible sheet packing which is shiftable radially within the space enclosed by said cage members and has a radially flanged portion in shiftable fluid-tight association with the inner face of one of said cage members and an axially sleeved portion of smaller inside diameter than the apertures in said cage members for rotatable fluid-tight association with a shaft passing through the same, a spacer member which is positioned about the axially sleeved portion of said packing and is clamped under pressure against the radially flanged portion of said packing by the inner face of the other of said cage members, and a spring member which is positioned under tension within the spacer member about the axially sleeved portion of said packing for constricting the packing on the shaft.

"2. In a seal, two axially spaced centrally apertured cage members, one of which is attached to the other, a leather packing which is shiftable radially within the space enclosed by said cage members and has a radially flanged portion of substantially uniform thickness in radially shiftable fluid-tight association with the inner face of one of said cage members and an axially sleeved portion of smaller inside diameter than the apertures in said cage members for rotatable fluid-tight association with a shaft passing through the same, a spacer ring which is positioned about the axially sleeved portion of said packing in radially spaced relation to the same and is clamped under pressure against the radially flanged portion of said packing by the inner face of the other of said cage members, and an endless coil spring of less thickness than the spacer ring which is positioned under tension within the spacer ring about the axially sleeved portion of said packing for constricting the packing about the shaft."

"9. As an article of manufacture, a self-contained seal for insertion as an assembled unit within a tubular housing in encompassing relation to a centrally located shaft, consisting of a hollow inwardly opening annular cage, a flanged packing member housed within the cage with the radially extending portion of the member positioned against one end of the cage in spaced relation to the other end, a spacing ring positioned between the radially extending portion of the packing member and the opposite end of the cage, a spring member enclosed within the spacing ring for constricting the packing member on the shaft, and circumferentially interlocking means between both the packing member and the ring and the cage and the ring.

"10. As an article of manufacture, a self-contained seal for insertion as an assembled unit within a tubular housing in encompassing relation to a centrally located shaft, consisting of a hollow inwardly opening annular cage, a flanged packing member housed within the cage with the radially extending portion of the member positioned against one end of the cage in spaced relation to the other end, a spacing ring positioned between the radially extending portion of the packing member and the opposite end of the cage, a spring member enclosed within the spacing ring for constricting the packing member on the shaft, spurs on the spacing ring in embedded engagement with the packing member to prevent relative rotation therebetween, and a projection on the cage in interlocked engagement with the recess in the spacing ring to prevent relative rotation therebetween."

[*Official Gazette October 29, 1935.*]